(12) United States Patent
Perk et al.

(10) Patent No.: US 12,214,566 B2
(45) Date of Patent: Feb. 4, 2025

(54) METHOD FOR MANUFACTURING A CUSHION AND CUSHION

(71) Applicant: OTTO BOCK MOBILITY SOLUTIONS GMBH, Königsee-Rottenbach (DE)

(72) Inventors: Heinrich Perk, Berlin (DE); Sarah McCarvill, Bremen (DE); Arne Hothan, Berlin (DE); Johann-Christoph Müller, Berlin (DE); Frank Stefan Klingebiel, Duderstadt (DE)

(73) Assignee: OTTO BOCK MOBILITY SOLUTIONS GMBH, Königsee-Rottenbach (DE)

( * ) Notice: Subject to any disclaimer, the term of this patent is extended or adjusted under 35 U.S.C. 154(b) by 731 days.

(21) Appl. No.: 17/436,054

(22) PCT Filed: Mar. 4, 2020

(86) PCT No.: PCT/EP2020/055661
§ 371 (c)(1),
(2) Date: Sep. 2, 2021

(87) PCT Pub. No.: WO2020/178318
PCT Pub. Date: Sep. 10, 2020

(65) Prior Publication Data
US 2022/0168985 A1   Jun. 2, 2022

(30) Foreign Application Priority Data
Mar. 4, 2019   (DE) ................. 102019105425.7

(51) Int. Cl.
B29D 99/00   (2010.01)
A47C 27/08   (2006.01)
(Continued)

(52) U.S. Cl.
CPC ........ *B29D 99/0092* (2013.01); *A47C 27/085* (2013.01); *B29C 43/18* (2013.01);
(Continued)

(58) Field of Classification Search
CPC ... A47C 23/002; A47C 27/083; A47C 27/085; A47G 9/1027; B29C 43/18;
(Continued)

(56) References Cited

U.S. PATENT DOCUMENTS 1,575,388 A   3/1926   Roberts
1,865,230 A * 6/1932   Bronson ................. B29C 35/02
                                                      156/219

(Continued)

FOREIGN PATENT DOCUMENTS

CN   1059117 A     3/1992
CN   201131528 Y  10/2008
(Continued)

OTHER PUBLICATIONS

Translation of DE102019105425 A1.*
(Continued)

*Primary Examiner* — Sonya M Sengupta
(74) *Attorney, Agent, or Firm* — HOLLAND & HART LLP

(57) ABSTRACT

The invention relates to a method for producing a cushion for an orthopedic device, the cushion having at least one fluid-filled volume, wherein the method includes compression molding of a three-dimensional first cushion component made of at least a first material, which is preferably elastic, in a mold that comprises an inner mold and an outer mold, and bonding the first cushion component to at least a second cushion component in such a way that the fluid-filled volume is created.

18 Claims, 8 Drawing Sheets

(51) Int. Cl.
*B29C 43/18* (2006.01)
*B29K 105/04* (2006.01)

(52) U.S. Cl.
CPC .. *B29K 2105/04* (2013.01); *B29K 2995/0005* (2013.01); *B29K 2995/0046* (2013.01)

(58) Field of Classification Search
CPC ........ B29K 2105/04; B29K 2995/0005; B29K 2995/0046; B29D 99/0092; A61G 2203/34; A61G 5/1045
See application file for complete search history.

(56) References Cited

U.S. PATENT DOCUMENTS

| | | | |
|---|---|---|---|
| 3,872,526 A * | 3/1975 | Betts | A47C 21/006 5/678 |
| 5,533,220 A | 7/1996 | Sebag et al. | |
| 5,596,781 A | 1/1997 | Graebe | |
| 5,845,352 A | 12/1998 | Matsler et al. | |
| 6,386,856 B1 | 5/2002 | Chern | |
| 6,943,694 B1 | 9/2005 | Ellis | |
| 2004/0237201 A1 | 12/2004 | Fraser | |
| 2005/0125905 A1 | 6/2005 | Wilkinson | |
| 2007/0277320 A1 | 12/2007 | Massmann | |
| 2008/0166524 A1 | 7/2008 | Skaja | |
| 2008/0201853 A1 | 8/2008 | Graebe | |
| 2022/0168985 A1 * | 6/2022 | Perk | A47C 23/002 |

FOREIGN PATENT DOCUMENTS

| | | |
|---|---|---|
| DE | 69721782 T2 | 5/2004 |
| DE | 60009367 T2 | 3/2005 |
| EP | 2006152 A2 | 12/2008 |
| JP | S63-297039 A | 12/1988 |
| JP | 2004-188173 A | 7/2004 |
| JP | 2005270524 A * | 10/2005 ........... A47C 27/085 |
| JP | 2008-528123 A | 7/2008 |
| JP | 2008-279063 A | 11/2008 |
| JP | 2010-029312 A | 2/2010 |
| JP | 2018-046901 A | 3/2018 |
| WO | WO-8903203 A1 * | 4/1989 |
| WO | 2015/121822 A1 | 8/2015 |

OTHER PUBLICATIONS

Translation of JP2005270524 A.*
International Search Report and Written Opinion issued in International Application PCT/EP2020/055661, mailed Apr. 7, 2020, 16 pgs.
Chinese Patent Office, "Office Action," issued in connection with China Patent Application No. 202080018309.7 dated Oct. 8, 2023 (11 pages) (2 pages of English Translation and 9 pages of Original Document).
Chinese Patent Office, "Office Action," issued in connection with China Patent Application No. 202080018309.7 dated Feb. 11, 2023 (12 pages) (2 pages of English Translation and 10 pages of Original Document).
Japan Patent Office "Office Action", issued in connection with Japan Patent Application No. 2021-552241, dated Feb. 27, 2024 (12 pages) (6 pages of English Translation and 6 pages Original Document).

* cited by examiner

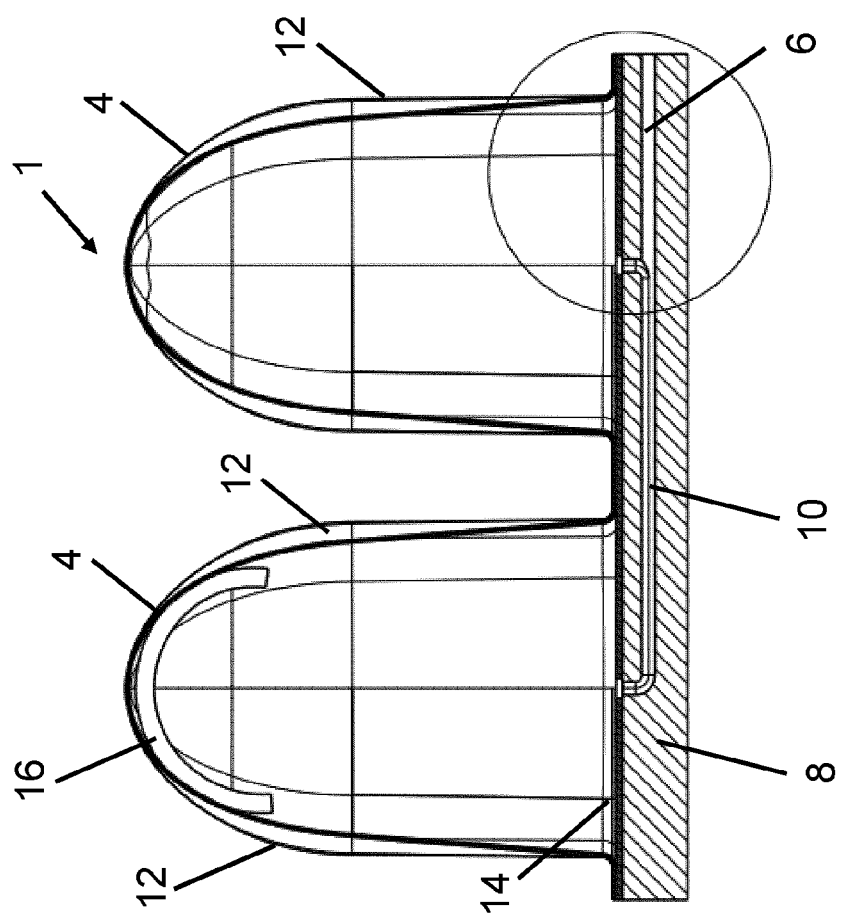
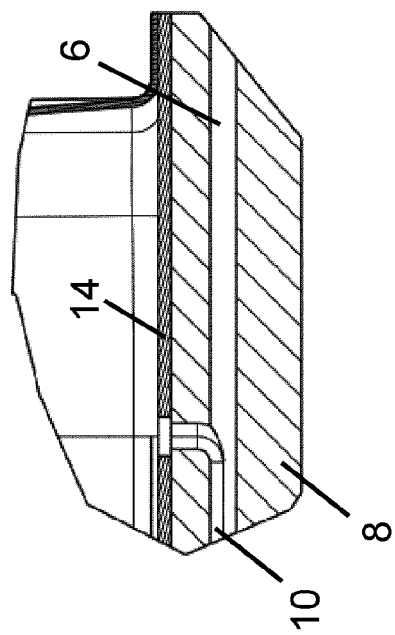
Fig. 4

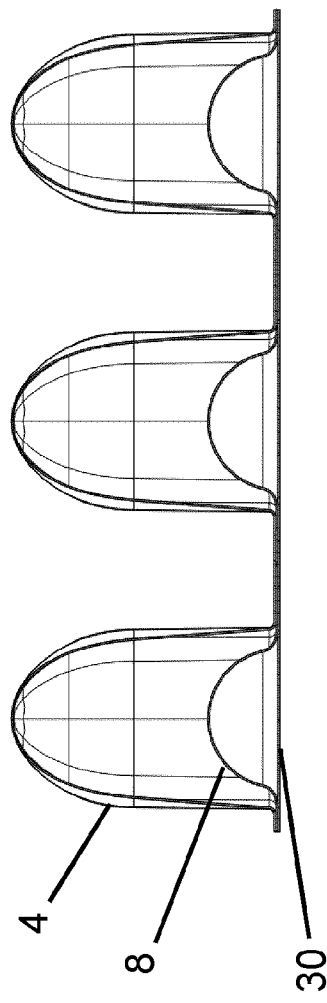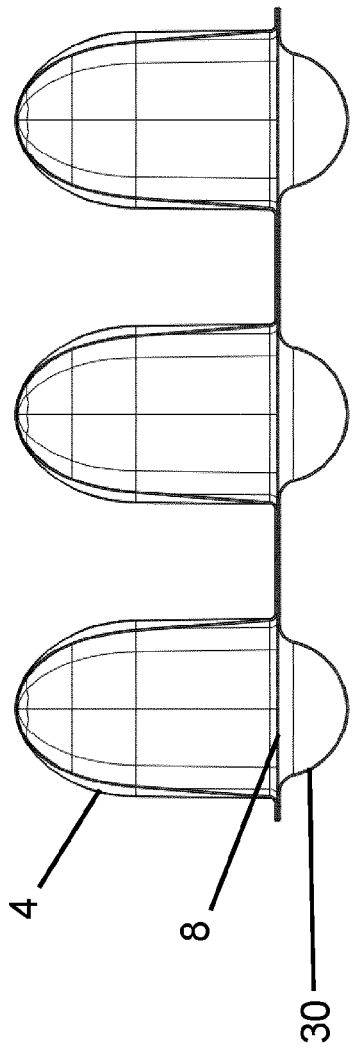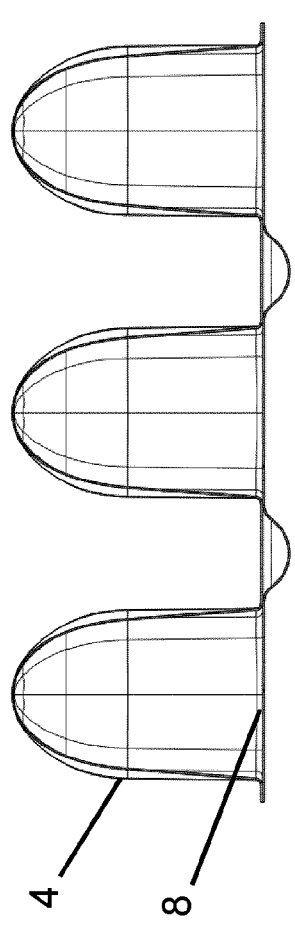

METHOD FOR MANUFACTURING A CUSHION AND CUSHION

CROSS-REFERENCE TO RELATED APPLICATIONS

This is a national phase application of International Application No. PCT/EP2020/055661, filed 4 Mar. 2020, which claims the benefit of German Patent Application Ser. No. 102019105425.7, filed 4 Mar. 2019, the disclosures of which are incorporated, in their entireties, by this reference.

TECHNICAL FIELD

The invention relates to a method for producing a cushion for an orthopedic device, the cushion having at least one fluid-filled volume.

BACKGROUND

Numerous orthopedic devices have cushions, for example, to protect and cushion body parts supported in the orthopedic device. This relates, for example, to seat cushions, backrests, headrests, abduction wedges and other cushions for, for example, wheelchairs, mattresses and cushions for orthopedic beds and hospital beds, as well as cushions such as those arranged in orthoses to protectively support a body part supported in the orthosis. In the present case, a cushion is preferably understood to mean any fluid-filled element that is used for the support and/or positioning of at least one body part.

A number of these cushions are known from the prior art and feature a fluid-filled volume, such as an air cushion. Fluids are, for example, gases, gels, particularly viscoelastic gels or liquids. The volume that is filled with fluid is preferably formed of components that are made of an elastic material and is usually produced in at least two cushion components. A three-dimensional first cushion component, designed for example in the form of a cup or dome and having a cavity open on at least one side, and a second cushion component, preferably also made of an elastic material and which can be joined to the first cushion part, thereby closing the volume.

The three-dimensional first cushion component can be shaped appropriately for the intended use of the cushion. Such first cushion components are generally produced in a dipping process in which a preform, which forms the inner contour of the three-dimensional first cushion component to be produced, is immersed in a bath of liquid or at least softened material. Once the preform is removed from the material, a layer of the material remains on the preform and hardens. Depending on the desired wall thickness, this step in the method is repeated multiple times.

However, it is a disadvantage that it is not possible with this method to produce cushions in an optimal configuration, for example if different wall thicknesses, and in particular precisely defined wall thicknesses, are required in different areas of the cushion. In addition, the dipping process known from the prior art produces a relatively large proportion of the produced three-dimensional first cushion components with defects, so that the first cushion components, once hardened, can only be considered as rejects and cannot be used for the production of the cushions.

SUMMARY

The invention therefore aims to thus improve a method for producing such a cushion.

The invention solves the problem by way of a method of the type described above that comprises the following steps:
a) Compression molding of a three-dimensional first cushion component made of at least a first material, which is preferably elastic, in a mold that comprises an inner mold and outer mold,
b) Bonding the first cushion component to at least a second cushion component in such a way that the fluid-filled volume is created.

The main difference between the method according to the invention and the method known from the prior art for producing the fluid-filled volume for the cushion is that the three-dimensional first cushion component is produced in a compressing molding process. To this end, a mold is used that has an inner mold and an outer mold. The first cushion component is produced between the inner mold and the outer mold, wherein the first material from which the first cushion component is produced fills the entire gap between the inner mold and the outer mold. In this way, a three-dimensional first cushion component can be produced that is defined in contour, material thickness and surface quality, and produced according to the respective requirements by selecting a suitable inner and outer mold. The production of rejects or cushion components that cannot be used for further production is therefore greatly reduced. Further advantages are the possibility to specify the contour and/or surface structure and/or wall thickness more precisely by the selection and shape of the inner mold and/or the outer mold than is possible with methods of the prior art, and the very good reproducibility. In a preferred embodiment, the at least one second cushion component is also produced using the described compression molding process. It is especially preferable if the first cushion component and the at least one second cushion component are produced at the same time in a single mold.

The first and/or second material is preferably a silicone, a polyurethane or polychloroprene. In this case, it is possible that the respective material renders at least one further processing step necessary to achieve, for example, the desired gas tightness, which is often necessary with silicone in particular.

In a preferred embodiment, step a) in the compression molding process comprises the following steps:
a1) Filling the mold with raw material,
a2) Pressing the raw material between the inner mold and outer mold,
a4) Hardening or vulcanizing of the raw material between inner mold and outer mold, thereby creating the first cushion component.

In the first of these sub-steps, raw material, for example in the form of a blank, in the form of pellets, granules, a calendered sheet or powder or another semi-finished product, is filled into the mold. The raw material may also be provided in the form of one or multiple liquids that is/are filled into the mold. The raw material can, but need not necessarily, refer to the first material. Preferably, the filled raw material is heated inside the mold, so that it melts or at least softens enough so as to be malleable. This occurs, for example, at temperatures between 140° C. and 180° C. The step of heating is unnecessary if raw material is used that is already malleable at room temperature.

The raw material is preferably filled into and heated in the outer mold, which is, for example, a container that is open at the top. In this preferred embodiment, it is only at this point that the inner mold is inserted into the outer mold and the desired gap, which is to be filled by the first elastic material, is formed. This occurs in step a2) of the method, in which the raw material is pressed between the inner mold and the outer mold after heating. When the inner mold and outer mold are in this position, the raw material is then hardened or vulcanized, thereby creating the first elastic material. Alternatively, the mold can also be opened before the raw material is completely hardened or vulcanized. To this end, of course, it must already have sufficient strength so that the design of the cushion component to be produced, defined by the mold, is not lost. In this not yet fully hardened or vulcanized state, more additives can be added to achieve other effects. For example, a foaming additive can be used to produce a foamed part of the respective component.

For certain materials, it is necessary or at least beneficial to add additional elements, such as reaction partners of the raw material, to the mold along with the raw material. This then results in, for example, a chemical reaction during heating that ensures that the first elastic material is produced from the raw material.

Since, in the preferred embodiment of the method described here, the first cushion component is formed entirely within the mold and also hardens or vulcanizes within the mold, which is not the case with the method known from the prior art, it is especially easy to prevent disruptive influences from impacting the outer mold, material composition or other properties of the first cushion component to be produced or damages from occurring during hardening or vulcanizing.

In a preferred embodiment of the method, the first cushion component produced by compression molding and the second cushion component are fully hardened and/or vulcanized. To bond the two cushion components, raw material is arranged between the two cushion components, said raw material then preferably being hardened or vulcanized at an increased temperature and/or increased pressure. It thus bonds the two previously hardened or vulcanized cushion components together. The raw material used for the bonding can be the same raw material from which the cushion components have also been made, but it can also be a different raw material that can be vulcanized and/or hardened.

This further simplifies the method. Preferably, the first cushion component produced by compression molding is left in the mold, preferably the outer mold, after hardening or vulcanizing, even after opening the mold. As a result, the cushion component does not need to be removed and transferred into a different device or otherwise processed or handled. In this state, the second cushion component is arranged on the first cushion component in the position and orientation in which the two cushion components are to be bonded to one another. The raw material is preferably arranged on the first cushion component, for example applied at the bonding points where the first cushion component is to be bonded to the second cushion component. If the raw material is in a spreadable state, it can also be applied to the first cushion component and/or the second cushion component. To this end, the raw material is preferably heated until it is spreadable, preferably liquid.

Once the two cushion components with the raw material positioned between them have been placed against each other, they are preferably exposed to an increased temperature, i.e. heated up. It is especially preferable if a pressure is applied to both cushion components. This can be done, for example, by pressing a heated or heatable stamp onto the two cushion components, in particular by lowering it onto them. In this state, the raw material hardens or vulcanizes, thereby bonding the two cushion components.

In a preferred embodiment, the first cushion component and the second cushion component are designed together as a single piece, i.e. as parts of a single component. It is especially preferable if this is produced during the compression molding in step a) of the method. The two cushion components can be connected to each other, for example, by a film hinge, i.e. an area with reduced wall thickness compared to the wall thickness surrounding the film hinge. The first cushion component and the second cushion component are arranged and configured such that they can be moved, for example swivelled, relative to one another, and, for the purposes of bonding the two cushion components in step b) of the method, are brought into the required position and/or orientation. The component of which the the two cushion components are parts can be, for example, bent, folded or creased to bring the cushion components into the position and/or orientation relative to each other in which they will be bonded together.

Alternatively, it may be beneficial for the at least one second cushion component to be a separate component to the first cushion component. This is particularly beneficial if the second cushion component features a simple geometric form and contour, for example it is designed in the form of a plate.

The first cushion component and/or the second cushion component are preferably made of several different materials that preferably integrally bond, preferably vulcanize, to one another during production of the respective cushion component. Preferably, at least one of the materials is an elastic material; it is especially preferable for all materials to be elastic materials.

To be able to produce such cushion components, for example, multiple raw materials that result in different materials during vulcanization or hardening can be placed together in the mold for compression molding. If this is not done in a homogeneously distributed manner, but for example spatially separated, sections can be produced in this way in the first cushion component whose first material is predominantly or completely a first material, while other areas can be produced whose first material is completely or predominantly a second material. Of course, several different materials can be combined. Since the materials are integrally bonded to each other during production, in particular during compression molding, for example by chemically reacting, cross-linking, foaming or vulcanizing, a onepiece three-dimensional first cushion component is produced which has precisely predetermined mechanical, in particular elastic, properties without having to connect several cushion components to each other in a complicated and thus time-consuming and costly manner. If the first cushion component and the second cushion component are both produced by compression molding, particularly as a single piece, the second cushion component may also feature the advantages described for the first cushion component.

The cushion can also be produced from more than two cushion components, of which several or all are produced by a compression molding process as described here. Several or all of these cushion components can be produced by the same compression molding process, or a separate compression molding can be used for each cushion component. In addition, further cushion components can of course also be used that are not produced by a compression molding process.

Preferably, the fluid-filled volume features multiple chambers that are connected to one another by fluid connections. Alternatively or additionally, the volume features chambers that are not fluidically connected to other chambers. These multiple chambers may already be formed, for example, in the form of multiple moldings, depressions or cavities in the first cushion component, and in this case are closed off by the second cushion component only on the open side. Of course, the second cushion component may also have a three-dimensional form. However, it does not have to be panel-shaped. In particular, if the at least one second cushion component is also produced by a compression molding process as described here, the contour, wall thickness, material composition and/or surface quality and/or surface structure can be almost freely predetermined. The fuid connections preferably have a smaller cross-section than the individual chambers. In this way, for example, a cushion can be created that has special elastic and thus cushioning and dampening properties. Especially in the case that the volume has several chambers which are connected to each other by fluid connections, a damping effect is created, since the flow resistance created by the smaller cross-section of the fluid connections relative to the volume of the chamber impedes and hinders an exchange of the fluid between the chambers. This increases the supportive effect of the cushion.

In a preferred embodiment, the fluid-filled volume comprises multiple chambers, not all of which are connected to one another via a fluid connection. Instead, the multiple chambers form multiple, for example two, separate sub-volumes, which are made up of several interconnected chambers. The sub-volumes are not fluidically connected to each other.

Preferably, the first cushion component and/or the at least one second cushion component has areas of different wall thicknesses and/or a surface with areas of different structure and/or roughness. By using the compression molding process described here, these parameters can be created to be more precise so as to meet the requirements.

For example, if the cushion is a seat cushion for a wheelchair, it is beneficial for the wall thickness in the central area of the cushion, on which the user of the wheelchair will probably sit when using it, to be lower than in the edge area. If, for example, the user of the wheelchair who is sitting on the cushion bends to the side, for example to get a glass from a table, their weight shifts to the side. In this case, it is advantageous if the wall thickness of the first elastic material is greater in the side area than in the central area, for example, in order to provide support and hold for the user of the wheelchair in this way. An increased wall thickness can also increase the durability of the cushion. Preferably, this increases the wall thickness in areas that are subjected to higher loads. Since the wall thickness only depends on the distance between the inner mold and outer mold, it can be freely selected and adjusted through the careful selection of inner and outer mold. The same principle applies, for example, if the cushion is a mattress or a cushion for an orthopedic bed or hospital bed. In this case, it is also advantageous to provide areas with a greater wall thickness to support a user lying on the mattress or bed and, for example, to prevent them from rolling out of bed. Increased wall thickness is also useful, for example, in the areas of a mattress where the mattress is touched to move it, for example to turn it. The tensile forces occurring in very small areas can thus be easily taken into account.

An outer surface with varying degrees of roughness may also be beneficial. The fluid-filled volume may also be enclosed in a cover to give a visually appealing overall appearance and to create the interface with the user. This affects, for example, cleaning, the transmission of shear forces and the load transfer to the cushion and the fluid-filled volume. Other coatings, for example a metal coating to be arranged on the outside of the fluid-filled volume, can also be arranged and vapour-deposited more easily if the surface has a certain roughness in these areas. The roughness on the outside can be influenced by treating the inner contour of the outer mold accordingly.

It is beneficial if the inner mold and/or the outer mold is provided with a coating which is transferred to the first component during compression molding, the coating preferably being inserted into the mold and/or applied to the inner mold and/or the outer mold. The coating can be sprayed or brushed on, for example, or the respective mold is lubricated with the coating material. This allows a fluid-filled volume to be produced whose first cushion component is already provided with a coating. A subsequent coating of the completed cushion component or the fluid-filled volume is thus rendered redundant. In this way, the production effort can be reduced and production costs can be reduced at the same time. In particular, if the at least one second cushion component is produced by a compression molding process as described here, the at least one second cushion component is also provided with a coating as an alternative or in addition.

In a preferred embodiment, the at least one first material is a foaming material. If different materials are used as a first elastic material, they can all be foaming materials, wherein different foaming materials can be used. Of course, foaming materials can also be combined with non-foaming materials. In this way, the mechanical stability, elasticity, density and therefore the weight of the fluid-filled volume can be precisely adjusted at different points, so that, for example, the desired and ideal mechanical properties for the selected application can be created.

In a preferred embodiment of the method, at least one sensor and/or at least one actuator and/or at least one functional element is introduced into the first cushion component and/or arranged on the first cushion component during compression molding of the first cushion component. A functional element is, for example, a valve, an electrical conductor, a fastening element or a positive-locking element. If the objects are introduced into the cushion component, they are arranged between the inner mold and outer mold during compression molding. This may occur after the raw material has been filled into the mold or even beforehand. If the sensor or actuator is only arranged on the first cushion component, it is, for example, inserted into a depression of the inner mold and/or outer mold, so that during compression molding, the first material, which forms the first cushion component, is bonded to the corresponding element, i.e. the sensor and/or actuator, as it hardens or vulcanizes. If the at least one second cushion component is also produced by a compression molding process as described here, it is particularly easy to also equip the at least one second cushion component with at least one sensor, at least one actuator and/or at least one functional element. Of course, these objects can also be arranged in and/or on the first cushion component and/or the second cushion component in another way.

Potential sensors are, for example, pressure or moisture sensors, which collect measurement values for the cushion, for example, when it is subjected to a load and transfer said values to an evaluation device. To this end, electrical lines for the purposes of signal transmission may also be embedded in the respective cushion component. Alternatively or additionally, wireless communication between a sensor, which has been incorporated into the respective cushion component, and an electronic evaluation device is also possible. For example, an actuator may be a pump and/or an actively controlled valve, which is especially advantageous if the fluid-filled volume has multiple chambers which the fluid can be pumped into and out of. In this way, for example, mattresses or cushions can be produced where a user resting on them, for example, can be repositioned without the need for care or support staff.

Preferably, during compression molding, an element, for example a grid of an electrically conductive material, is introduced into the at least one elastic material or the at least one first elastic material is made electrically conductive. Alternatively or additionally, the first elastic material is already an electrically conductive material.

The invention also solves the problem by way of a cushion for an orthopedic device that is or can be produced according to a method described here as well as by way of an orthopedic device with at least one such cushion.

BRIEF DESCRIPTION OF THE DRAWINGS

In the following, some examples of embodiments of the present invention will be explained in more detail by way of the attached figures: They show.

DETAILED DESCRIPTION

Figure 1:
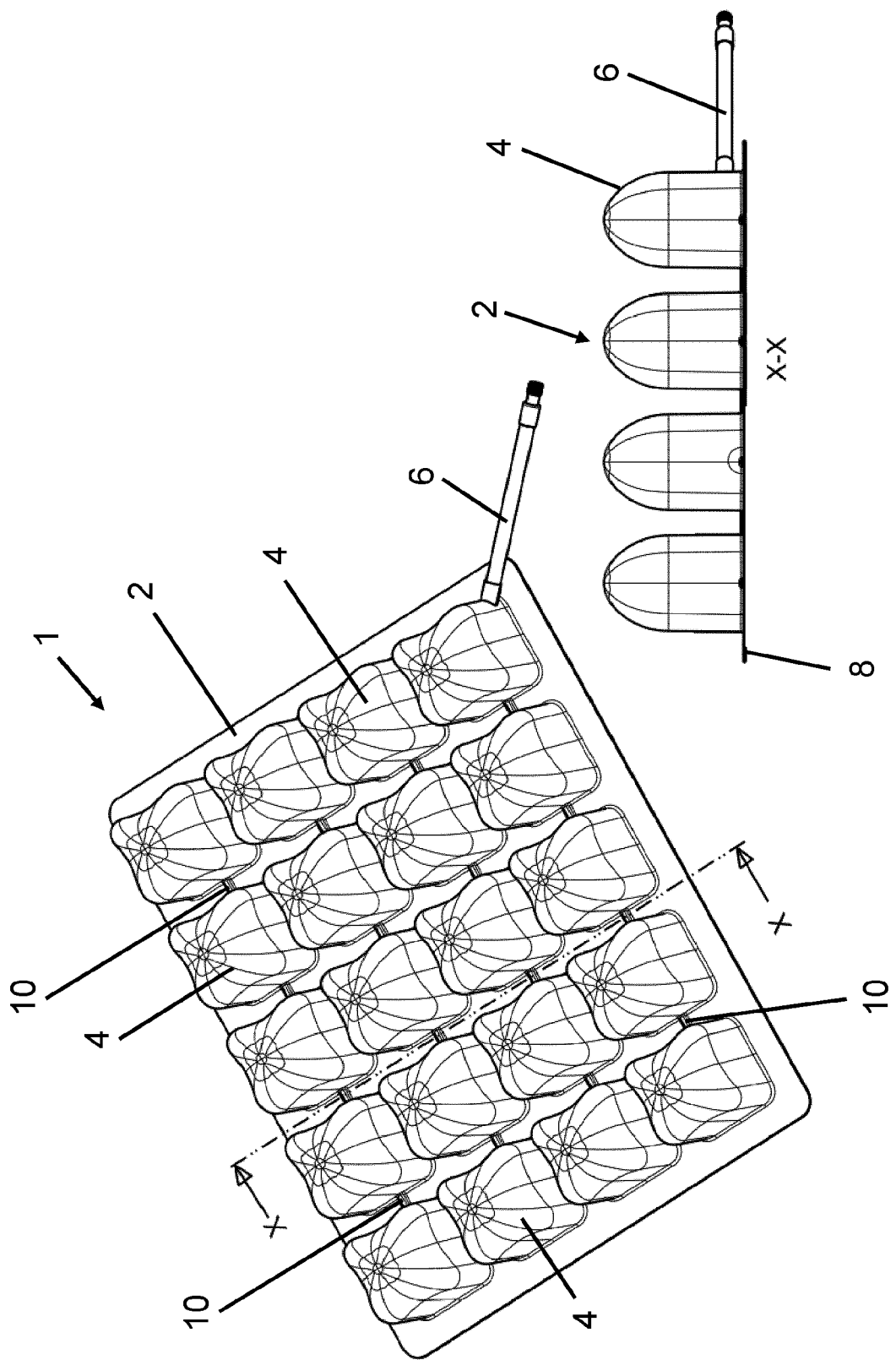
FIG. 1—the schematic, three-dimensional representation of a cushion in a top view and a sectional view, FIG. 2—the schematic, three-dimensional view of another cushion, FIG. 3—a sectional representation through FIG. 2, FIG. 4—the sectional representation through another cushion with an enlarged section, FIGS. 5-7—different stages in the compression molding process, FIGS. 8-10—different stages with single-piece cushion components, FIGS. 11 and 12—different stages with foaming material and FIGS. 13-15—sectional representations through different cushions according to various examples of an embodiment of the present invention.

FIG. 1 shows a cushion 1 that is produced according to a method according to an example of an embodiment of the present invention. The left-hand section of FIG. 1 depicts a three-dimensional view and the right-hand part the sectional representation along the line X-X.

A first cushion component 2 can be seen, which features a plurality of bulges 4 and a supply line 6. The sectional representation in the right-hand section of FIG. 1 shows that the first cushion component 2 features bulges 4 that in FIG. 1 are open at the bottom, where they are sealed by a second cushion component 8. The first cushion component 2 is bonded to the second cushion component 8 in such a way that the interior of the bulges 4 forms a volume that is filled with a fluid, for example a gas or a liquid. The supply line 6 renders it possible to adjust the amount of fluid in the volume by, for example, pumping fluid into or releasing fluid from the volume.

In the three-dimensional in FIG. 1, it can be seen that fluid connections 10 are provided between the individual bulges 4, by means of which the individual bulges 4 and the volume enclosed beneath them are fluidically connected to each other. If the cushion depicted in FIG. 1 is used, for example, as a seat cushion for a wheelchair, not all bulges 4 is subjected to the same load by the weight of a user sitting on the cushion. The fluid can then be displaced via the fluid connections 10 from the bulges 4 subjected to a greater load into those subjected to a lesser load.

Figure 2:
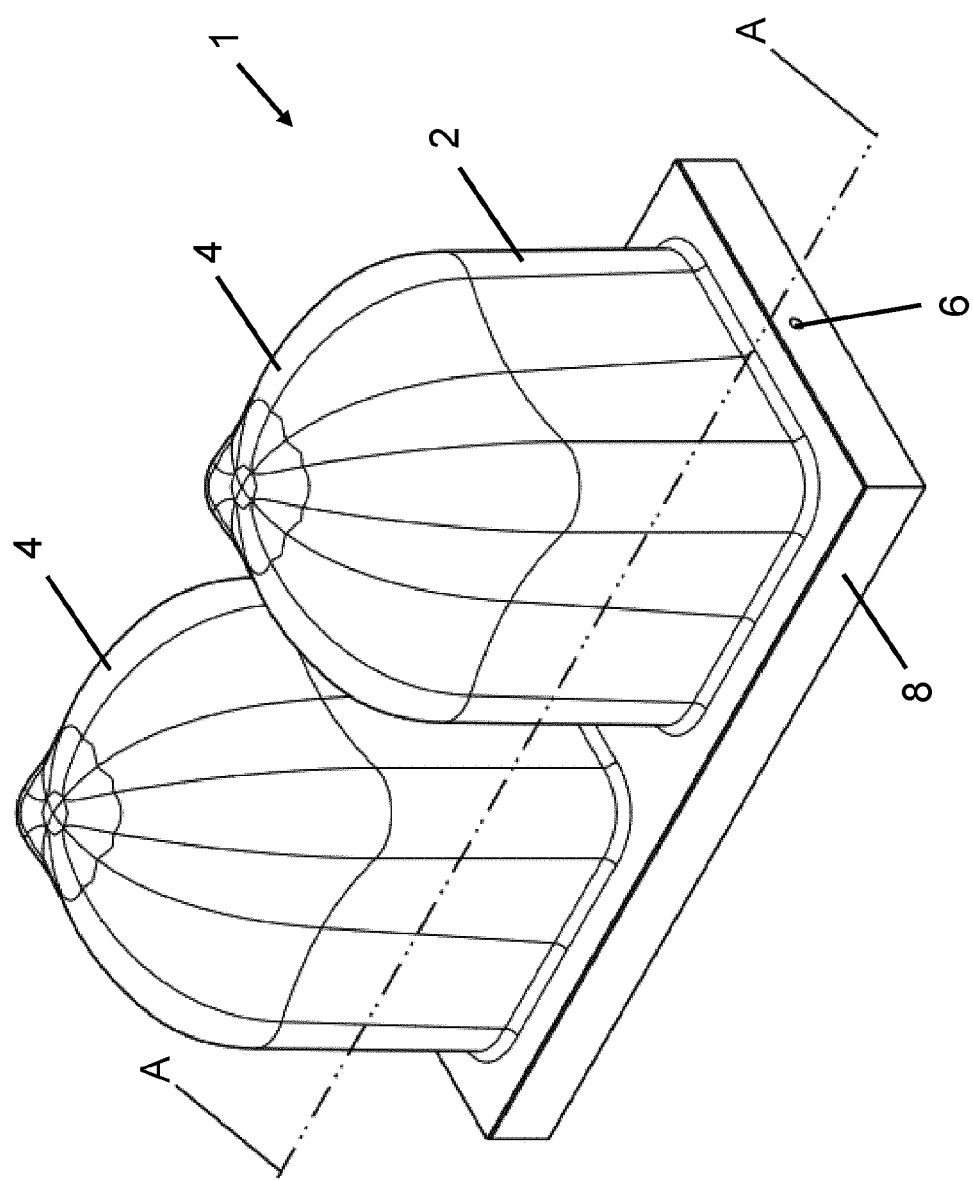

FIG. 2 depicts another embodiment of a cushion 1 with a first cushion component 2 that features two bulges 4 and is sealed on the underside by a second cushion component 8. In this case, the supply line 6 is integrated in the second cushion component 8, as shown in FIG. 3 for example, which depicts a sectional representation through the cushion 1 from FIG. 2.

Figure 3:
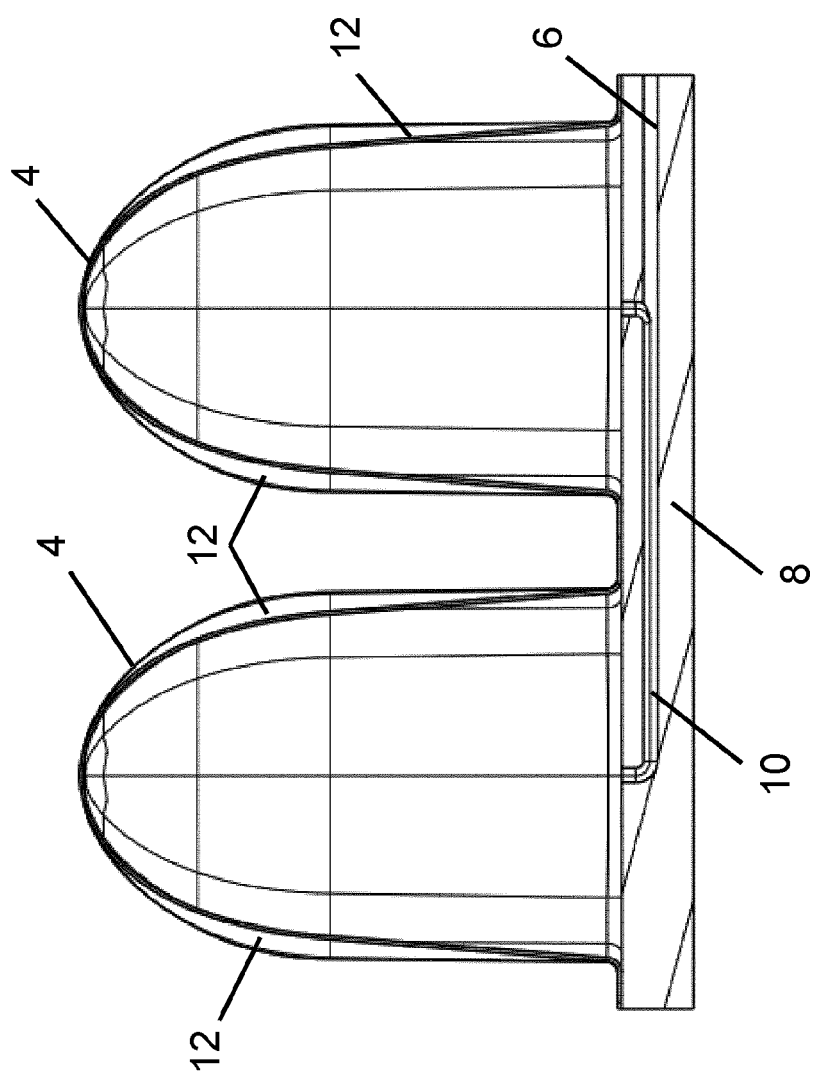

FIG. 3 shows the two bulges 4 that are sealed on their underside by the second cushion component 8. Integrated in the second cushion component 8 is the supply line 6 on the one hand and a fluid connection 10 on the other, which connects the two bulges 4 and the enclosed volume beneath it. Together, they form the fluid-filled volume, the fluid filling of which can be influenced via the supply line 6.

FIG. 3 also shows that a wall thickness of a wall 12 of the bulges 4 is not constant; instead, the wall thickness is particularly great at approximately the halfway height of the bulge 4. These changes in wall thickness, which cannot be achieved at all or with the desired precision with conventional methods from the prior art, can be achieved via the careful selection of the inner mold and outer mold of the mold used in the compression molding process.

FIG. 4 depicts a sectional representation through another embodiment of a cushion 1. An enlarged section of the right-hand part of FIG. 4 is shown.

In FIG. 4, the cushion 1 features two bulges 4, the wall 12 of which has a varying wall thickness. The first cushion component 2, which features the two bulges 4, is sealed on the underside by the second cushion component 8. The supply line 6 and the fluid connection 10 are again located in said second cushion component, said fluid connection fluidically connecting the two volumes enclosed beneath the two bulges. In addition, the second cushion component 8 now features a coating 14 on its upper side that may be produced, for example, during the compression molding process. The coating 14 is, for example, a film or a net that is inserted into the inner mold and/or outer mold of the mold used in the compression molding process and thus integrally bonded to the second material of the second cushion component 8.

In the left-hand representation of FIG. 4, it can also be seen that a reinforcement element 16 is present within the bulge 4 shown on the left, which has also already been attached to the first material of the bulge 4 during the compression molding process. In the example of an embodiment shown, this refers to a reinforcement element that increases the mechanical load capacity. Alternative embodiments may be, for example, sensors, valves, supply or evacuation lines or other functional elements.

Figure 5:
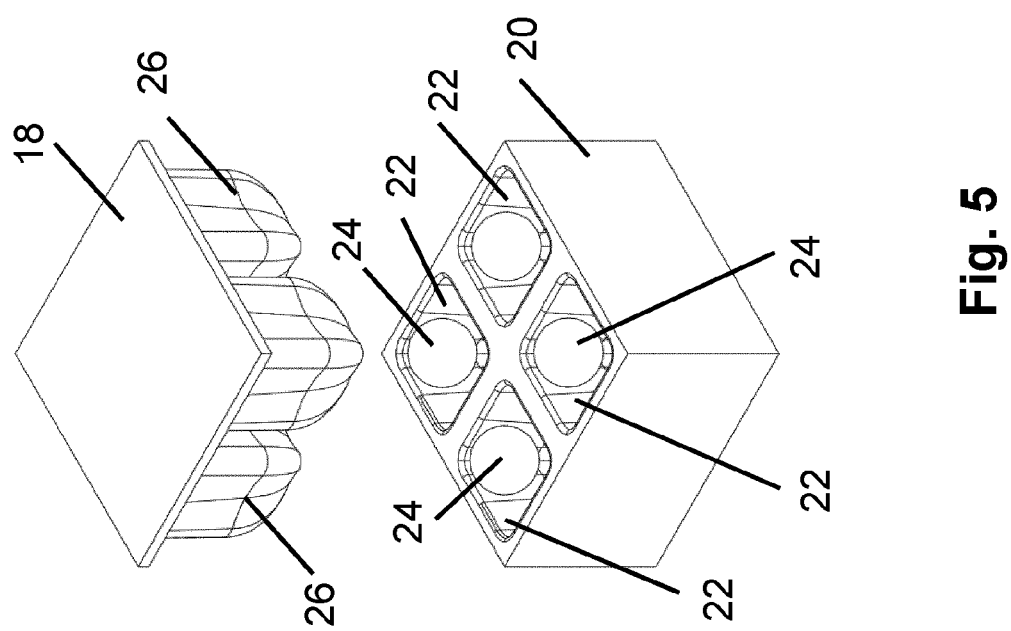

FIG. 5 depicts a first step in the compression molding process. An inner mold 18 and outer mold 20 are visible. The outer mold 20 features four depressions 22, each containing raw material 24 that is to be pressed. The inner mold 18 comprises four projections 26 that are designed to correspond to the depression 22 and penetrate into the depressions 22 when the inner mold 18 is introduced into the outer mold 20.

Figure 6:
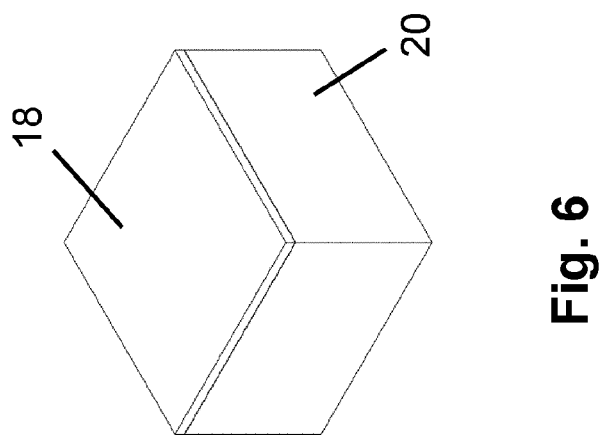

This situation is depicted in FIG. 6. It shows the inner mold 18 that is completely contained within the outer form 20.

Figure 7:
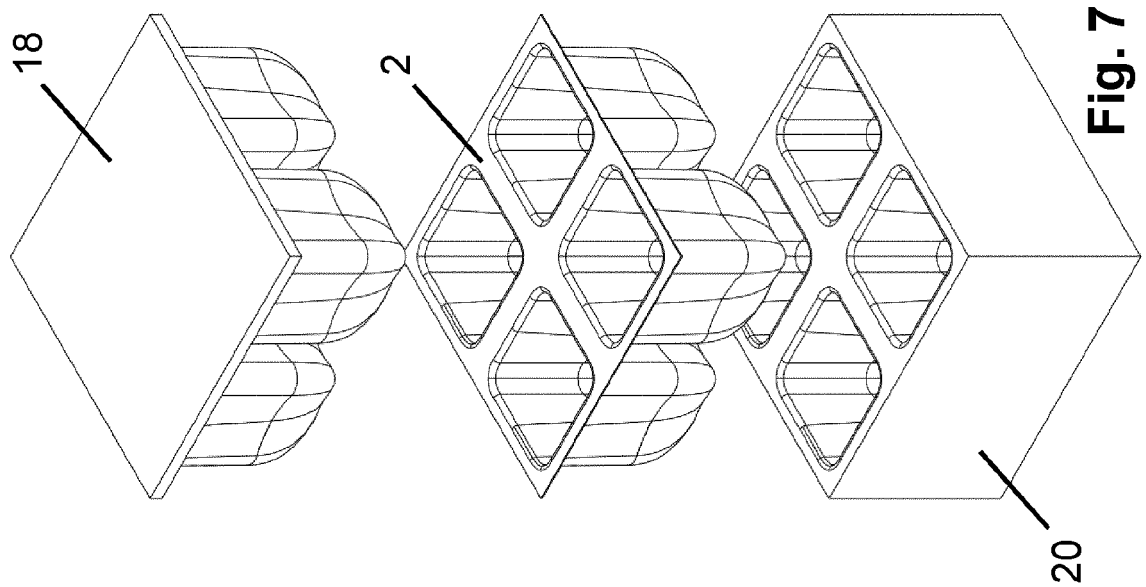

FIG. 7 shows the situation after the inner mold 18 has been removed from the outer mold 20. The first cushion component 2 was produced between the inner mold 18 and the outer mold 20 during compression molding.

Figure 8:
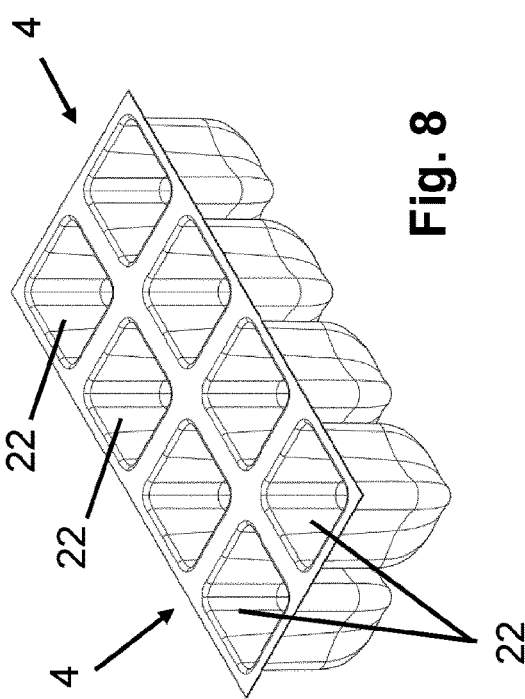

FIG. 8 depicts a component in which the first cushion component 2 and the second cushion component 8 are designed as a single piece. Both cushion components are produced during compression molding. The component shown has two rows of four depressions 22, of which the left two depressions 22 belong to the second cushion component 8 and the right two depressions 22 belong to the first cushion component 2 respectively.

Figure 9:
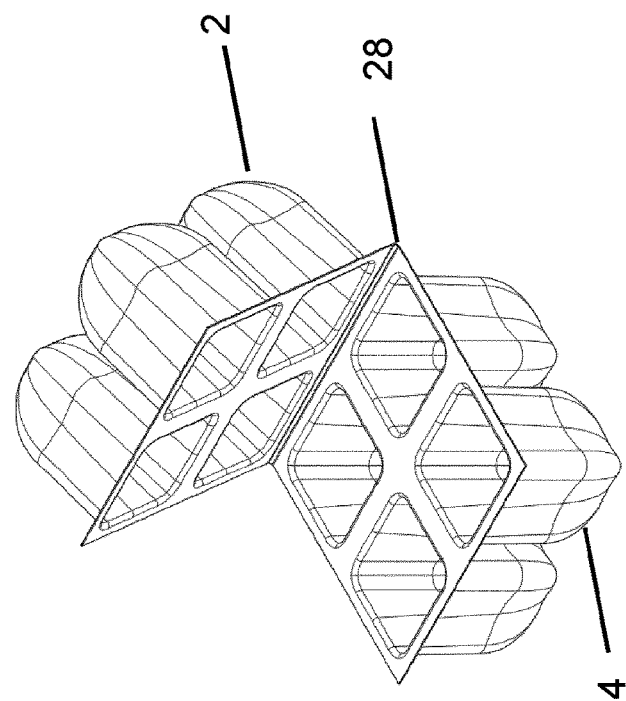

FIG. 9 shows that a film hinge 28 is arranged between the first cushion component 2 and the second cushion component 4, so that the first cushion component 2 and the second cushion component 4 can be swivelled relative to one another.

Figure 10:
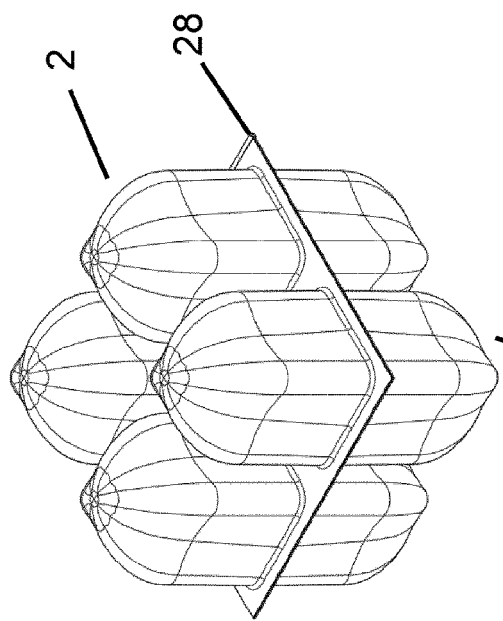

In FIG. 10, the first cushion component 2 has been swivelled so far relative to the second cushion component 4 that the two cushion components rest on one another and can be bonded. This results in the fluid-filled volume.

Figure 12:
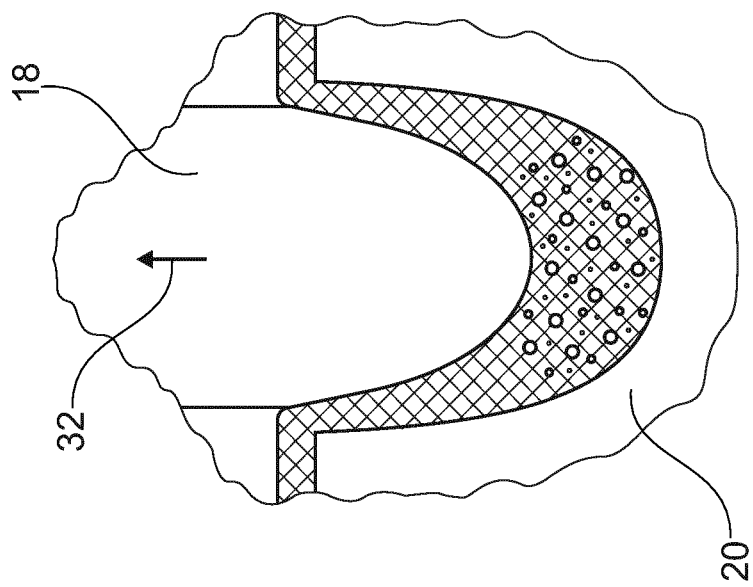
Figure 11:
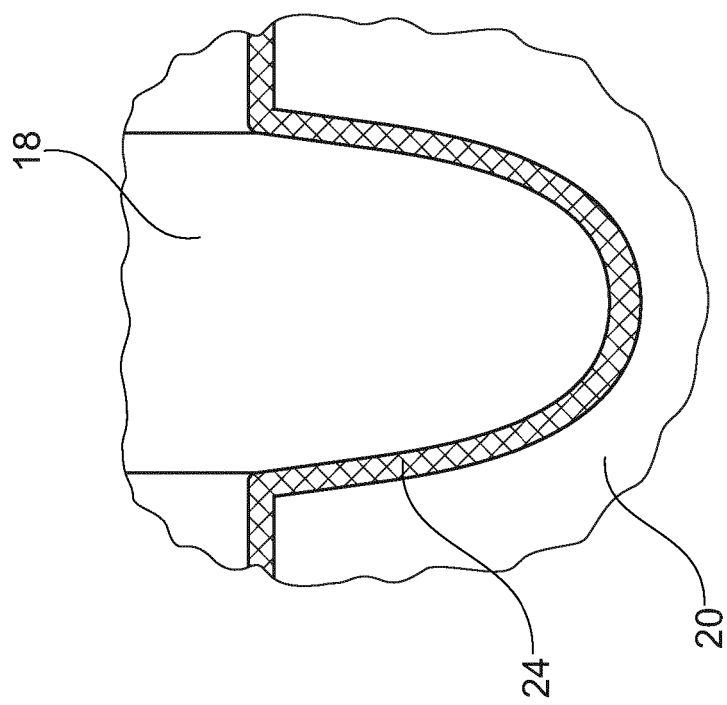

FIGS. 11 and 12 depict a sectional view of two different stages in the compression molding process. The inner mold 18 can be seen in both figures, which, in the representation shown, has been introduced into the outer mold 20 from above. In FIG. 11, the raw material 24 is situated between them. The mold is closed, i.e. the situation is shown as in FIG. 6.

In the representations shown, the raw material 24 is a foaming material, so that the volume occupied by the material of the first cushion component 2 to be produced is significantly increased compared to the volume of the raw material. In order to allow the foaming to take place in a controlled and reproducible manner during the compression molding process, the inner mold 18 and the outer mold 20 are brought into the position shown in FIG. 11, in which there is no or only very little free volume in the mold. FIG. 12 shows that the inner mold 18 is moved along the arrow 32 as the raw material 24 foams to form the finished material of the first cushion component 2. This allows the speed of the volume increase, the prevailing pressure and the final volume to be adjusted.

FIGS. 13 and 14 depicts sectional representations through a cushion that is composed of three cushion components. The first cushion component 2 shows the previously described bulges 4 that are limited on their underside by the second cushion component 8. In FIG. 12, this second cushion component 8 is also designed to be curved and protrudes into the bulges 4 of the first cushion component 2. In FIGS. 13 and 14, a third cushion component 30 is arranged beneath the second cushion component 8. This creates a further chamber between the second cushion component 8 and the third cushion component 30 in addition to the chamber between the first cushion component 2 and the second cushion component 8. In FIG. 13, both chambers are arranged in the bulge 4. This embodiment is especially advantageous if the first cushion component 2 becomes damaged and is no longer fluid-tight for the contained fluid. In this case, the chambers between the second cushion component 8 and the third cushion component 30 can assume the function in an at least weakened or partial manner.

Preferably, the chambers between the first cushion component 2 and the second cushion component 8 are fluidically connected to each other and form a sub-volume. The chambers between the second cushion component 8 and the third cushion component 30 are also fluidically connected to each other and form a further sub-volume. However, there is preferably no fluid connection between the two sub-volumes formed in this manner.

FIG. 14 depicts an embodiment of a cushion in a sectional representation that only differs from the embodiment shown in FIG. 13 in that the chambers between the second cushion component 8 and the third cushion component 30 are arranged not inside the bulge 4, but below it.

FIG. 15 shows an embodiment that does not have a third cushion component. Further chambers, formed between the first cushion component 2 and the second cushion component 8, are situated between the individual bulges 4 of the first cushion component 2. They can be connected to each other and/or to the chambers below the bulges 4.

REFERENCE LIST 1 cushion
2 first cushion component
4 bulge
6 supply line
8 second cushion component
10 fluid connection
12 wall
14 coating
16 reinforcement element
18 inner mold
20 inner mold
22 depression
24 raw material
26 projection
28 film hinge
30 third cushion component
32 arrow

The invention claimed is:

1. A method for producing a cushion for an orthopedic device, the cushion having more than one fluid-filled volume, wherein the fluid-filled volumes feature multiple chambers that are connected to each other via fluid connections, wherein the method comprises the following steps:
  a) Compression molding of a three-dimensional first cushion component made of at least a first material, which is preferably elastic, in a mold that comprises an inner mold and an outer mold,
  b) Bonding the first cushion component to at least a second cushion component in such a way that the fluid-filled volumes are created.

2. The method according to claim 1, wherein step a) comprises the following steps:
  a1) Filling the mold with raw material,
  a2) Pressing the raw material between the inner mold and outer mold,
  a3) Hardening or vulcanizing the raw material between the inner mold and the outer mold, thereby creating the first cushion component.

3. The method according to claim 1, wherein the first cushion component and the second cushion component are designed as a single piece and produced during compression molding in step a) of the method.

4. The method according to claim 1, wherein the second cushion component is a separate component to the first cushion component.

5. The method according to claim 1, wherein the first cushion component and/or the second cushion component are made of several different materials that integrally bond, and in some cases, vulcanize, to one another during production.

6. The method according to claim 1, wherein the first cushion component and/or the at least one second cushion component has areas of different wall thicknesses and/or a surface with areas of different structure and/or roughness.

7. The method according to claim 1, wherein the inner mold and/or the outer mold is provided with a coating which is transferred to the first component during compression molding, the coating preferably being inserted into the mold and/or applied to the inner mold and/or the outer mold.

8. The method according to claim 1, wherein the at least one first material is a foaming material.

9. The method according to claim 1, wherein at least one sensor and/or at least one actuator and/or at least one functional element is introduced into the first cushion component and/or arranged on the first cushion component during compression molding of the first cushion component.

10. The method according to claim 1, wherein during compression molding an element of an electrically conductive material is introduced into the at least one first elastic material or the at least one first elastic material is electrically conductive.

11. A cushion for an orthopedic device that is or can be produced by a method according to claim 1.

12. A method for producing a cushion for an orthopedic device having more than one fluid-filled volume, wherein the fluid-filled volumes feature multiple chambers that are connected to each other via fluid connections, the method comprising the steps of:
  compression molding a three-dimensional first cushion component from at least a first material in a mold that comprises an inner mold and an outer mold by filling the mold with at least the first material, pressing the at least a first material between the inner mold and outer mold, hardening the raw material between the inner mold and the outer mold; and
  bonding the first cushion component to at least a second cushion component in such a way that the fluid-filled volumes are created, wherein the first cushion component and/or the at least one second cushion component has areas of different wall thicknesses and/or a surface with areas of different structure and/or roughness.

13. The method according to claim 12 wherein the first cushion component and the second cushion component are designed as a single piece and produced during compression molding.

14. The method according to claim 12 wherein the second cushion component is a separate component to the first cushion component.

15. The method according to claim 12, wherein the inner mold and/or the outer mold is provided with a coating which is transferred to the first component during compression molding.

16. The method according to claim 12, wherein the first material is a foaming material.

17. The method according to claim 12, wherein at least one sensor and/or at least one actuator and/or at least one functional element is introduced into the first cushion component and/or arranged on the first cushion component during compression molding of the first cushion component.

18. A method for producing a cushion for an orthopedic device having more than one fluid-filled volume, wherein the fluid-filled volumes feature multiple chambers that are connected to each other via fluid connections, the method comprising the steps of:
  compression molding a three-dimensional first cushion component from at least a first foaming material in a mold that comprises an inner mold and an outer mold by filling the mold with at least the first material, pressing the at least a first material between the inner mold and outer mold, hardening the raw material between the inner mold and the outer mold; and
  bonding the first cushion component to at least a second cushion component in such a way that the fluid-filled volumes are created, wherein at least one sensor and/or at least one actuator and/or at least one functional element is introduced into the first cushion component and/or arranged on the first cushion component during compression molding of the first cushion component.

* * * * *